G. R. WEST.
Bee Hive.
No. 3,554.
Patented April 20, 1844.
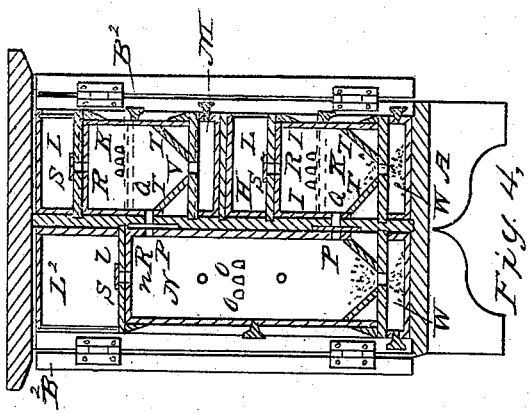
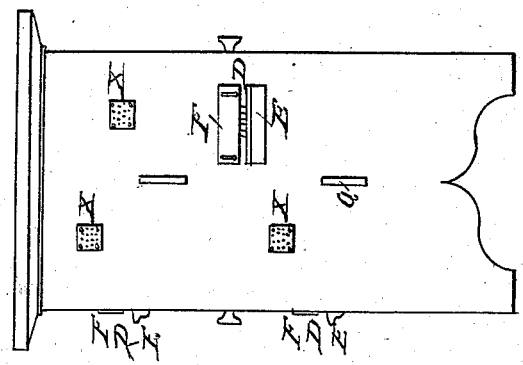
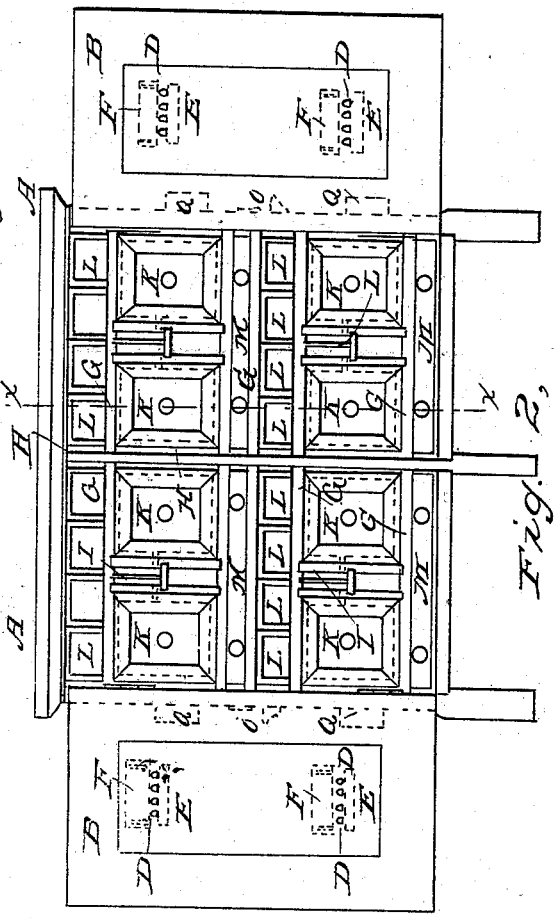
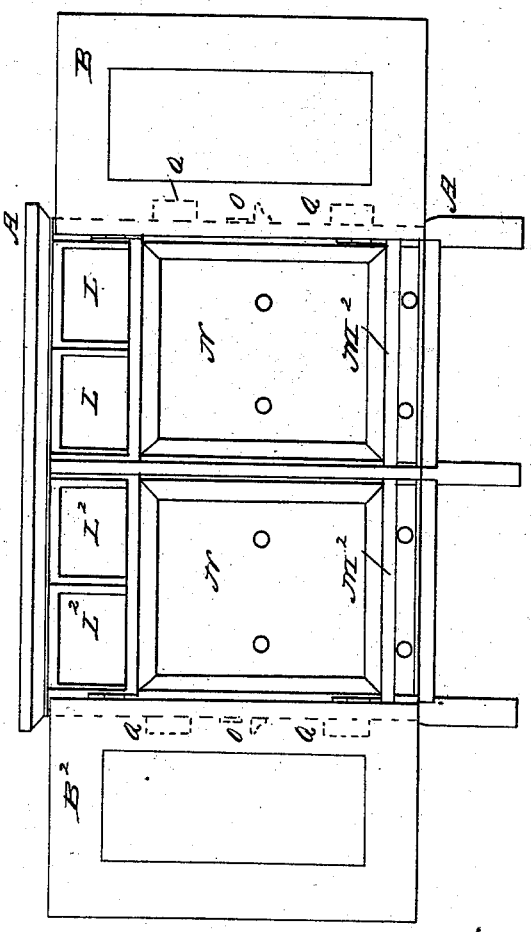

UNITED STATES PATENT OFFICE.

GEO. R. WEST, OF FAIRFIELD, OHIO.

BEEHIVE.

Specification of Letters Patent No. 3,554, dated April 20, 1844.

*To all whom it may concern:*

Be it known that I, GEORGE R. WEST, of Fairfield, in the county of Huron and State of Ohio, have invented a new and useful Improvement in the Construction of Houses for the Preservation and Culture of Bees, called "West's Improved Bee-House," which is described as follows, reference being had to the annexed drawings, of the same, making part of this specification.

Figure 1 is a view of the front of the house with the doors open. Fig. 2 is a view of the back. Fig. 3 is a vertical section at the line $x$ $x$ of Fig. 1.

The nature of my invention and improvement consists in so arranging the boxes in which the bees deposit their honey that they shall not be obliged to travel a long distance, or perform a circuitous route, in order to gain access to the several places wherein they deposit their honey nor compel the several parties of bees occupying the several boxes to encounter each other at a common entrance, as in bee hives usually constructed where they often fight and impede the progress of the work; but that the arrangement of the boxes shall be such that there shall be a small entrance and a separate short way or passage leading directly to each box—the entrance being made so as to admit the bees freely and at the same time to exclude the moth, having a small box with a glass front placed above the aforesaid box communicating therewith in which the bees are to deposit their honey removable at pleasure for the facility of discharging the same of the honey therein contained whenever required, the interior of said boxes being rendered dark during the operation of the bees by the closing of the doors which are represented open in the drawings. Also in having drawers arranged below the aforesaid boxes for catching the filth descending from the boxes without disturbing the bees. Likewise in constructing the bee house with two large apartments in the back of the house for first hiving the bees in which they may increase to the degree required until they are sufficiently strong to defend themselves against an invading party of bees and by which arrangement of rooms the bees are prevented from swarming and leaving the house by opening doors leading to other parts of the house in front in which they take up their abode. Also in having apertures in the ends of the house above the boxes from end to end for effectually ventilating the house.

A represents the frame of the bee house which is closed at the sides top and bottom in the usual manner.

B are the doors in front, $B^2$ being the back doors.

D are the small separate entrances made in the front doors through which the bees pass to their several boxes.

E are the rests or ledges or shelves upon which the bees light.

F are the slides for closing said entrances.

G are horizontal partitions for dividing the several ranges of boxes placed over each other.

H is a vertical partition dividing the front ranges of apartments.

I in Fig. 1 are vertical parallel partitions dividing the passages of the front range of apartments the top and the bottom of these partitions I are also represented by dotted lines I in Fig. 3.

K are the front apartments for the bees.

L are the small drawers with glass fronts placed above the boxes in which the bees deposit white honey comb removable at pleasure—the glass doors being designed for occasionally examining the operations of the bees—said small drawers being open in the bottom thereof communicating with apertures in the top of the apartments K opened or closed by the buttons S. M the filth drawers placed below the apartments K for catching the filth that descends from them—removable and replaceable at pleasure. The filth descends over the inclined bottoms T and passes through the opening V to the filth drawers.

N are the back apartments made spacious for the operation of the bees in the usual manner. O the entrance to the aforesaid large apartments made in the ends of the bee house about the middle thereof. P passages leading from the back large rooms to the front small rooms. See Fig. 3. Q slides for closing the passages P when required. In removing the glazed boxes L the openings in the top of the apartments below them are closed by turning buttons or slides S. There are also glazed boxes placed above the rooms N communicating therewith by passages $l$, $n$.

The bottoms of the boxes L $L^2$ are channeled at R so as to form passages for the air that enters through the perforated plates X over the openings in the end of the house for ventilating the house. The bottoms T of the hives are inclined from the sides to the center openings therein for discharging the filth through said openings into the drawers M. The doors B should be made even on the inside and without panels or recesses to prevent the bees from passing from one side of the partition to the other.

What I claim as my invention and which I desire to secure by Letters Patent is—

The arrangement of the hives K with the double inclined bottoms in combination with the filth drawers M extending under both hives—said hives being separated before their entrances by the division plates I. I do not claim the double inclined bottom nor a filth drawer under the same, but I claim the above combination.

G. R. WEST.

Witnesses:
Wm. P. Elliot,
A. E. Johnson.